United States Patent
Nakajima

(10) Patent No.: US 9,521,340 B2
(45) Date of Patent: *Dec. 13, 2016

(54) APPARATUS AND METHOD FOR DETECTING A DEFECTIVE PIXEL

(71) Applicant: Sony Corporation, Tokyo (JP)

(72) Inventor: Tsutomu Nakajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,448

(22) Filed: Aug. 13, 2015

(65) Prior Publication Data

US 2015/0350578 A1 Dec. 3, 2015

Related U.S. Application Data

(63) Continuation of application No. 12/926,618, filed on Nov. 30, 2010, now Pat. No. 9,137,465.

(30) Foreign Application Priority Data

Nov. 30, 2010 (JP) ................................. 2009-283760

(51) Int. Cl.
| | | |
|---|---|---|
| H04N 9/64 | (2006.01) |
| H04N 5/367 | (2011.01) |
| H04N 5/372 | (2011.01) |
| H04N 5/63 | (2006.01) |
| H04N 5/378 | (2011.01) |
| H04N 5/3745 | (2011.01) |
| H04N 17/00 | (2006.01) |

(52) U.S. Cl.
CPC .............. *H04N 5/367* (2013.01); *H04N 5/372* (2013.01); *H04N 5/378* (2013.01); *H04N 5/3745* (2013.01); *H04N 5/63* (2013.01); *H04N 17/002* (2013.01)

(58) Field of Classification Search
CPC ...................................................... H04N 5/367
USPC ........................................................ 348/246
See application file for complete search history.

(56) References Cited

U.S. PATENT DOCUMENTS

| | | | |
|---|---|---|---|
| 7,576,787 | B2 | 8/2009 | Kinoshita |
| 2008/0170146 | A1 | 7/2008 | McKee |
| 2010/0282946 | A1 | 11/2010 | Yin et al. |
| 2011/0013053 | A1 | 1/2011 | Chen et al. |

FOREIGN PATENT DOCUMENTS

JP       2009-105582        5/2009

*Primary Examiner* — Gary C Vieaux
(74) *Attorney, Agent, or Firm* — Chip Law Group

(57) ABSTRACT

An image pickup device without a light shielding device for blocking light received by a solid-state image pickup element, the image pickup device including: a supplying section configured to supply a signal for resetting a charge of a floating diffusion disposed so as to correspond to one or a plurality of pixels in the solid-state image pickup element; and a detecting section configured to detect a pixel in which change in output of the pixel after passage of a certain time from the resetting of the charge of the floating diffusion is larger than a predetermined threshold value.

3 Claims, 7 Drawing Sheets

RELATED ART

APPARATUS AND METHOD FOR DETECTING A DEFECTIVE PIXEL

CROSS REFERENCES TO RELATED APPLICATIONS

This is a Continuation application of U.S. patent application Ser. No. 12/926,618, filed Nov. 30, 2010, which in turn claims priority from Japanese Application No.: 2009-283760 filed in the Japan Patent Office on Dec. 15, 2009, the entire contents of which being incorporated herein by reference.

BACKGROUND OF THE INVENTION

1. Field of the Invention

The present invention relates to an image pickup device and a defect detecting method, and particularly to an image pickup device and a defect detecting method that enable defect detection in a solid-state image pickup element of an image pickup device without a light shielding device for blocking light such as an iris or the like to be made with more ease and at low cost.

2. Description of the Related Art

Correction of a defective pixel occurring in a solid-state image pickup element includes static defect correction and dynamic defect correction.

Static defect correction corrects a defective pixel detected by testing a solid-state image pickup element before shipment from a factory or the like. In static defect correction, the addresses of all defective pixels are stored in a nonvolatile memory as a result of the test. It therefore suffices to interpolate pixel values for the pixels corresponding to the addresses on the basis of normal peripheral pixels. The defective pixels can thus be corrected easily.

However, because of the need to test the solid-state image pickup element in advance and provide a nonvolatile memory, an increase in chip cost is inevitable. In addition, when a defect in a defective pixel changes in degree depending on states such as temperature, a voltage value and the like, the degree of the defect at the time of the test and the degree of the defect at the time of the defect correction may differ from each other, so that the defective pixel may not be corrected properly.

On the other hand, dynamic defect correction detects a defective pixel by for example performing relative comparison between the pixel values of a pixel as a detection object and peripheral pixels during streaming, and corrects the detected defective pixel. In dynamic defect correction, defective pixels are detected at any time. Thus, it is not necessary to provide a nonvolatile memory for storing the addresses of all defective pixels, and it suffices to provide a small-capacity line memory.

A method for detecting such defective pixels differs according to the algorithm of a signal processing circuit that performs the method, and the accuracy of detection and correction of defective pixels is greatly affected by the processing power of the signal processing circuit.

For example, recently, solid-state image pickup elements have been miniaturized and increased in the number of pixels, and the light receiving area of photodiodes (PDs) forming pixels has been decreased steadily. In order to remedy this, there is a tendency to increase the light receiving area of PDs even if only slightly by making an amplifying transistor, a reset transistor, a floating diffusion (FD) and the like shared by a plurality of pixels. Accordingly, when a defect occurs in an FD shared by a plurality of pixels, for example, all the sharing pixels appear to be defective pixels. Therefore dynamic defect detection requires more accurate defect detection. In addition, the larger the number of sharing pixels, the higher the required capacity of a line memory used to detect defective pixels.

Incidentally, a technique is proposed which detects a defective pixel by performing image pickup in an image pickup device in a state of an iris being closed once, that is, in a state of a solid-state image pickup element being shielded from light when power is turned on, for example, and detecting a pixel value that stands out from the pixel values of respective pixels of the solid-state image pickup element.

For example, there is a technique for detecting and correcting defective pixels having different temperature characteristics by performing image pickup in a state of an iris being closed (see Japanese Patent Laid-Open No. 2009-105582, hereinafter referred to as Patent Document 1).

SUMMARY OF THE INVENTION

However, the above-described techniques of Patent Document 1 and the like cannot be applied to a solid-state image pickup element provided in a portable telephone or the like without an iris.

The present invention has been made in view of such a situation, and is to enable defect detection in a solid-state image pickup element of an image pickup device without a light shielding device for blocking light such as an iris or the like to be made with more ease and at low cost.

According to a first embodiment of the present invention, there is provided an image pickup device without a light shielding device for blocking light received by a solid-state image pickup element, the image pickup device including: supplying means for supplying a signal for resetting a charge of a floating diffusion disposed so as to correspond to one or a plurality of pixels in the solid-state image pickup element; and detecting means for detecting a pixel in which change in output of the pixel after passage of a certain time from the resetting of the charge of the floating diffusion is larger than a predetermined threshold value.

The supplying means can supply a signal for resetting a charge accumulated in a photodiode forming the pixel before the charge of the floating diffusion is reset.

The supplying means can supply a signal for resetting a charge accumulated in a photodiode forming an adjacent pixel adjacent to the pixel before the charge of the floating diffusion is reset.

The image pickup device can further include storing means for storing an address indicating a position of the pixel detected by the detecting means on a two-dimensional array in the solid-state image pickup element.

The image pickup device can further include correcting means for, when a pixel corresponding to an address indicating a position of the pixel detected by the detecting means on a two-dimensional array in the solid-state image pickup element is read, correcting a pixel value of the read pixel on a basis of a pixel value of a peripheral pixel on a periphery of the read pixel.

According to the first embodiment of the present invention, there is provided a defect detecting method in a solid-state image pickup element of an image pickup device without a light shielding device for blocking light received by the solid-state image pickup element, the defect detecting method including the steps of: supplying a signal for resetting a charge of a floating diffusion disposed so as to correspond to one or a plurality of pixels in the solid-state image pickup element; and detecting a pixel in which change in output of the pixel after passage of a certain time from the resetting of the charge of the floating diffusion is larger than a predetermined threshold value.

In the first embodiment of the present invention, a signal for resetting a charge of a floating diffusion disposed so as to correspond to one or a plurality of pixels is supplied in a solid-state image pickup element, and a pixel in which change in output of the pixel after passage of a certain time from the resetting of the charge of the floating diffusion is larger than a predetermined threshold value is detected.

According to a second embodiment of the present invention, there is provided an image pickup device without a light shielding device for blocking light received by a solid-state image pickup element, the image pickup device including: supplying means for supplying a signal for resetting a charge of a floating diffusion disposed so as to correspond to one or a plurality of pixels and a signal for resetting a charge accumulated in a photodiode forming a pixel in the solid-state image pickup element; and detecting means for detecting a pixel in which output of the pixel changes sharply when the charge accumulated in the photodiode is reset in a short exposure time from the resetting of the charge of the floating diffusion.

In the second embodiment of the present invention, a signal for resetting a charge of a floating diffusion disposed so as to correspond to one or a plurality of pixels and a signal for resetting a charge accumulated in a photodiode forming a pixel are supplied in a solid-state image pickup element, and a pixel in which output of the pixel changes sharply when the charge accumulated in the photodiode is reset in a short exposure time from the resetting of the charge of the floating diffusion is detected.

According to the first and second embodiments of the present invention, it is possible to make defect detection in a solid-state image pickup element of an image pickup device without a light shielding device for blocking light such as an iris or the like with more ease and at low cost.

DETAILED DESCRIPTION OF THE PREFERRED EMBODIMENTS

Preferred embodiments of the present invention will hereinafter be described with reference to the drawings. Incidentally, description will be made in the following order.
1. First Embodiment (Defect Detection when Floating Diffusion Has Defect)
2. Second Embodiment (Defect Detection when Photodiode Has Defect Growing in Short Period)

1. First Embodiment

Example of Configuration of Image Pickup Device

Figure 1:
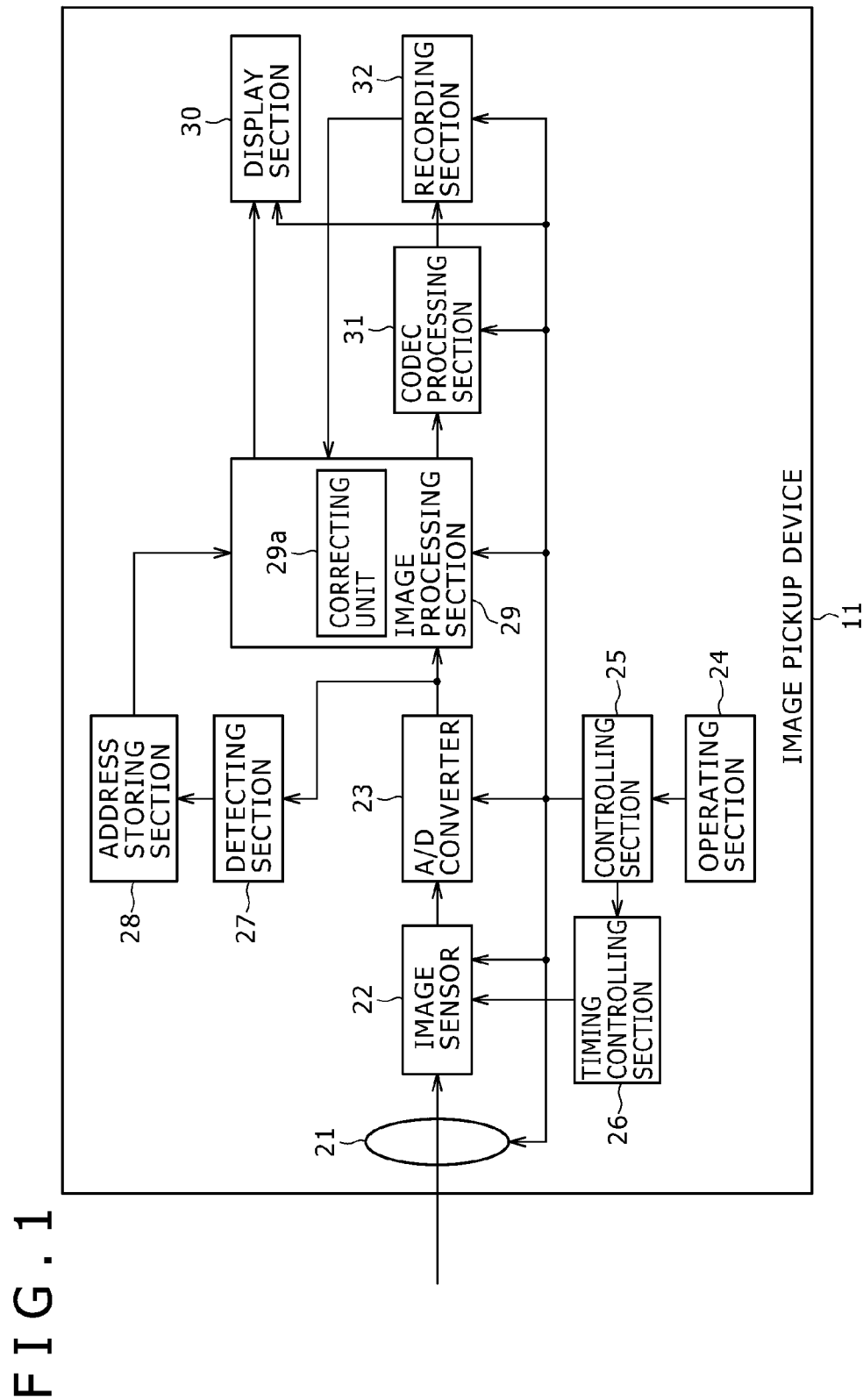
FIG. 1 is a block diagram showing an example of configuration of an embodiment of an image pickup device to which the present invention is applied.

FIG. 1 is a block diagram showing an example of configuration of an embodiment of an image pickup device to which the present invention is applied.

The image pickup device 11 of FIG. 1 is a portable telephone or a personal computer provided with an image pickup function without a light shielding device for blocking light such as an iris. The image pickup device 11 may be any device as long as the image pickup device 11 does not have a light shielding device but has an image pickup function using a solid-state image pickup element. Description in the following will be made supposing that the image pickup device 11 is a portable telephone provided with an image pickup function.

The image pickup device 11 of FIG. 1 includes a lens section 21, an image sensor 22, an A/D (Analog to Digital) converter 23, an operating section 24, a controlling section 25, a timing controlling section 26, a detecting section 27, an address storing section 28, an image processing section 29, a display section 30, a codec processing section 31, and a recording section 32.

The lens section 21 adjusts focus to a subject, condenses light from a focused position, and supplies the condensed light to the image sensor 22.

The image sensor 22 is a solid-state image pickup element formed by a CCD (Charge Coupled Device), a CMOS (Complementary Metal Oxide Semiconductor) or the like. The image sensor 22 receives light made incident on the image sensor 22 (incident light), converts the light into a voltage signal (analog signal) corresponding to the intensity of the light by performing photoelectric conversion of the light in timing controlled by the timing controlling section 26, and then supplies the voltage signal to the A/D converter 23. The voltage signal output from the image sensor 22 is output by each pixel (photoelectric conversion element) arranged two-dimensionally in the image sensor 22.

The A/D converter 23 converts the voltage signal of each pixel which voltage signal is supplied in predetermined timing from the image sensor 22 into a digital image signal (hereinafter referred to also as a pixel signal as appropriate). The A/D converter 23 sequentially supplies the digital image signal to the detecting section 27 and the image processing section 29 in predetermined timing.

The operating section 24 is formed by a jog dial (trademark), keys, buttons, or a touch panel, for example. The operating section 24 receives an operating input by a user, and supplies a signal corresponding to the operating input to the controlling section 25.

On the basis of the signal corresponding to the operating input of the user which signal is input from the operating section 24, the controlling section 25 controls the lens section 21, the image sensor 22, the A/D converter 23, the timing controlling section 26, the image processing section 29, the display section 30, the codec processing section 31, and the recording section 32.

The timing controlling section 26 supplies a driving signal for driving the image sensor 22 to the image sensor 22 on the basis of control of the controlling section 25. The timing controlling section 26 thus controls timing of driving of the image sensor 22.

The detecting section 27 detects a pixel having a defect (defective pixel) on the basis of the voltage level of the voltage signal of each pixel which voltage signal is supplied in predetermined timing from the A/D converter 23. The detecting section 27 supplies an address indicating the position of the detected defective pixel on a two-dimensional array to the address storing section 28.

The address storing section 28 is formed as a volatile memory. The address storing section 28 stores the address of the defective pixel which address is supplied from the detecting section 27. The address of the defective pixel which address is stored in the address storing section 28 is output to the image processing section 29 as appropriate.

The image processing section 29 subjects the image signal supplied from the A/D converter 23 to various image processing such as white balance adjustment, demosaic processing, matrix processing, gamma correction, and YC conversion, and then supplies the image signal to the display section 30 and the codec processing section 31.

In addition, the image processing section 29 has a correcting unit 29a. The correcting unit 29a reads the address of the defective pixel which address is stored in the address storing section 28, and performs predetermined correction processing on the image signal (pixel value) of the pixel corresponding to the address when the image signal is subjected to the above-described image processing.

The display section 30 is formed as a liquid crystal display in the case where the image pickup device 11 is a portable telephone. The display section 30 displays a state of radio wave reception, a battery remaining quantity, the names of parties to call and telephone numbers registered in a telephone directory, a history of transmissions, contents of electronic mail, Web pages and the like, and displays an image of a subject on the basis of an image signal from the image processing section 29.

The codec processing section 31 subjects the image signal from the image processing section 29 to coding processing of a predetermined system, and then supplies image data obtained as a result of the coding processing to the recording section 32.

The recording section 32 records the image data from the codec processing section 31. The image data recorded in the recording section 32 is output to the image processing section 29 as appropriate, and thus supplied to the display section 30, so that the corresponding image is displayed.

[Example of Circuit Configuration of Image Sensor]

An example of circuit configuration of the image sensor 22 in FIG. 1 will next be described with reference to FIG. 2.

Figure 2:
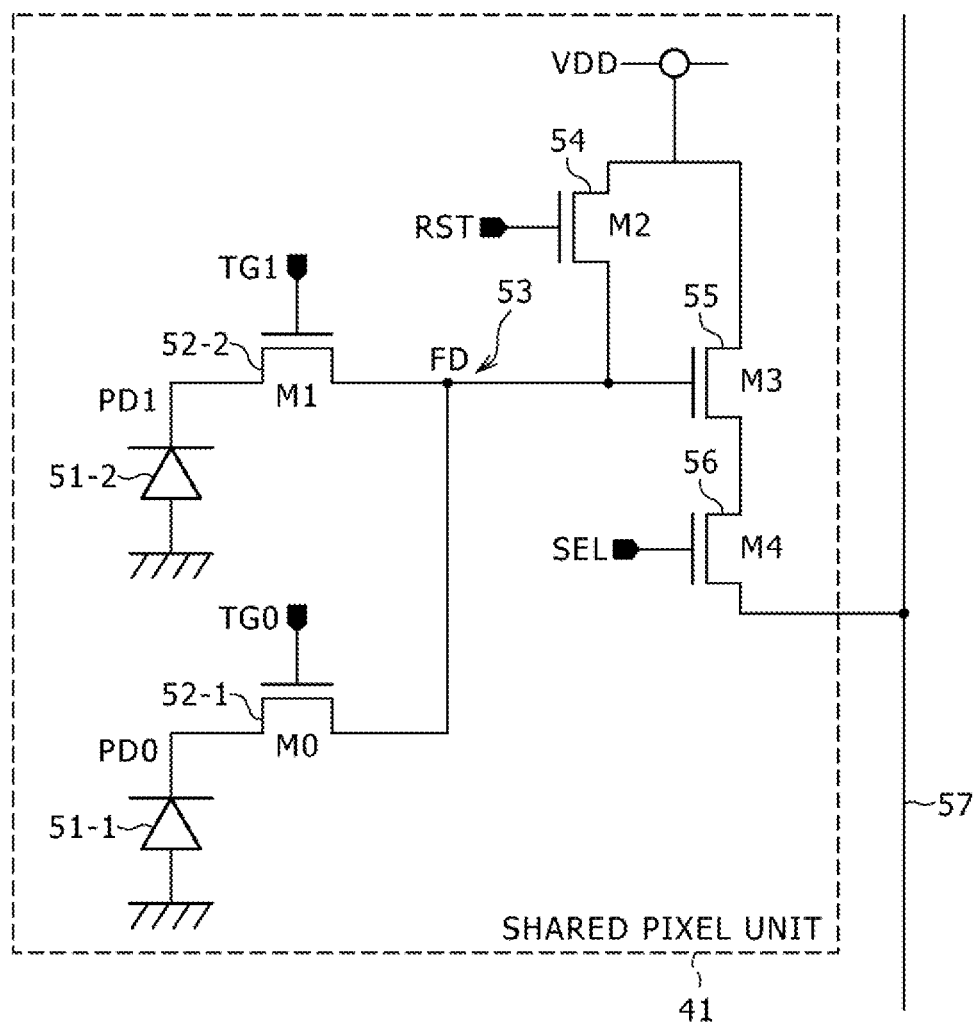
FIG. 2 is a diagram showing an example of circuit configuration of an image sensor.

The circuit shown in FIG. 2 is formed as a shared pixel unit having two photodiodes (pixels) present within the circuit.

The shared pixel unit 41 in FIG. 2 includes photodiodes (PD0 and PD1) 51-1 and 51-2, transfer transistors (M0 and M1) 52-1 and 52-2, a floating diffusion (FD) 53, a reset transistor (M2) 54, an amplifying transistor (M3) 55, and a selecting transistor (M4) 56.

The anodes of the photodiodes 51-1 and 51-2 are grounded. The cathodes of the photodiodes 51-1 and 51-2 are connected to the sources of the transfer transistors 52-1 and 52-2, respectively. The drains of the transfer transistors 52-1 and 52-2 are each connected to the drain of the reset transistor 54 and the gate of the amplifying transistor 55. This point of connection forms the floating diffusion 53.

The source of the reset transistor 54 and the source of the amplifying transistor 55 are connected to a predetermined power supply voltage VDD. The drain of the amplifying transistor 55 is connected to the source of the selecting transistor 56. The drain of the selecting transistor 56 is connected to a vertical signal line (VSL) 57. In addition, the A/D converter 23 described in FIG. 1 is connected in a stage succeeding the vertical signal line 57.

The gates of the transfer transistors 52-1 and 52-2, the gate of the reset transistor 54, and the gate of the selecting transistor 56 are each connected to the timing controlling section 26 in FIG. 1 via a control line not shown in FIG. 2 to be supplied with a pulse as a driving signal.

The photodiodes 51-1 and 51-2 perform photoelectric conversion of incident light, thereby generating a charge corresponding to the amount of the light, and accumulate the charge.

The transfer transistors 52-1 and 52-2 switch on/off the transfer of the charges from the photodiodes 51-1 and 51-2 to the floating diffusion 53 according to driving signals TG0 and TG1 supplied from the timing controlling section 26 (FIG. 1). For example, when the driving signal TG0 at an H (High) level is supplied to the transfer transistor 52-1, the transfer transistor 52-1 transfers the charge accumulated in the photodiode 51-1 to the floating diffusion 53. When the driving signal TG0 at an L (Low) level is supplied to the transfer transistor 52-1, the transfer transistor 52-1 stops the transfer of the charge. Incidentally, the charges obtained by the photoelectric conversion of the photodiodes 51-1 and 51-2 while the transfer transistors 52-1 and 52-2 stop the transfer of the charges to the floating diffusion 53 are accumulated in the photodiodes 51-1 and 51-2, respectively.

The floating diffusion 53 accumulates the charges transferred from the transfer transistors 52-1 and 52-2, and converts the charges into a voltage.

The reset transistor 54 switches on/off the discharge of a charge accumulated in the floating diffusion 53 according to a driving signal RST supplied from the timing controlling section 26. For example, when the driving signal RST at an H-level is supplied to the reset transistor 54, the reset transistor 54 clamps the floating diffusion 53 to the power supply voltage VDD, thereby discharging (resets) the charge accumulated in the floating diffusion 53. When the driving signal RST at an L-level is supplied to the reset transistor 54, the reset transistor 54 sets the floating diffusion 53 in an electrically floating state.

The amplifying transistor 55 amplifies the voltage corresponding to the charge accumulated in the floating diffusion 53. The voltage (voltage signal) amplified by the amplifying transistor 55 is output to the vertical signal line 57 via the selecting transistor 56.

The selecting transistor 56 switches on/off the output of the voltage signal from the amplifying transistor 55 to the vertical signal line 57 according to a driving signal SEL supplied from the timing controlling section 26. For example, when the driving signal SEL at an H-level is supplied to the selecting transistor 56, the selecting transistor 56 outputs the voltage signal to the vertical signal line 57. When the driving signal SEL at an L-level is supplied to the selecting transistor 56, the selecting transistor 56 stops the output of the voltage signal.

Thus, the shared pixel unit 41 is driven according to the driving signals TG0 and TG1, the driving signal RST, and the driving signal SEL supplied from the timing controlling section 26.

[Normal Operation of Shared Pixel Unit]

A normal operation of the shared pixel unit 41 when the pixel signal of the photodiode (PD0) 51-1 is output to the A/D converter 23 will next be described with reference to a timing diagram of FIG. 3.

Figure 3:
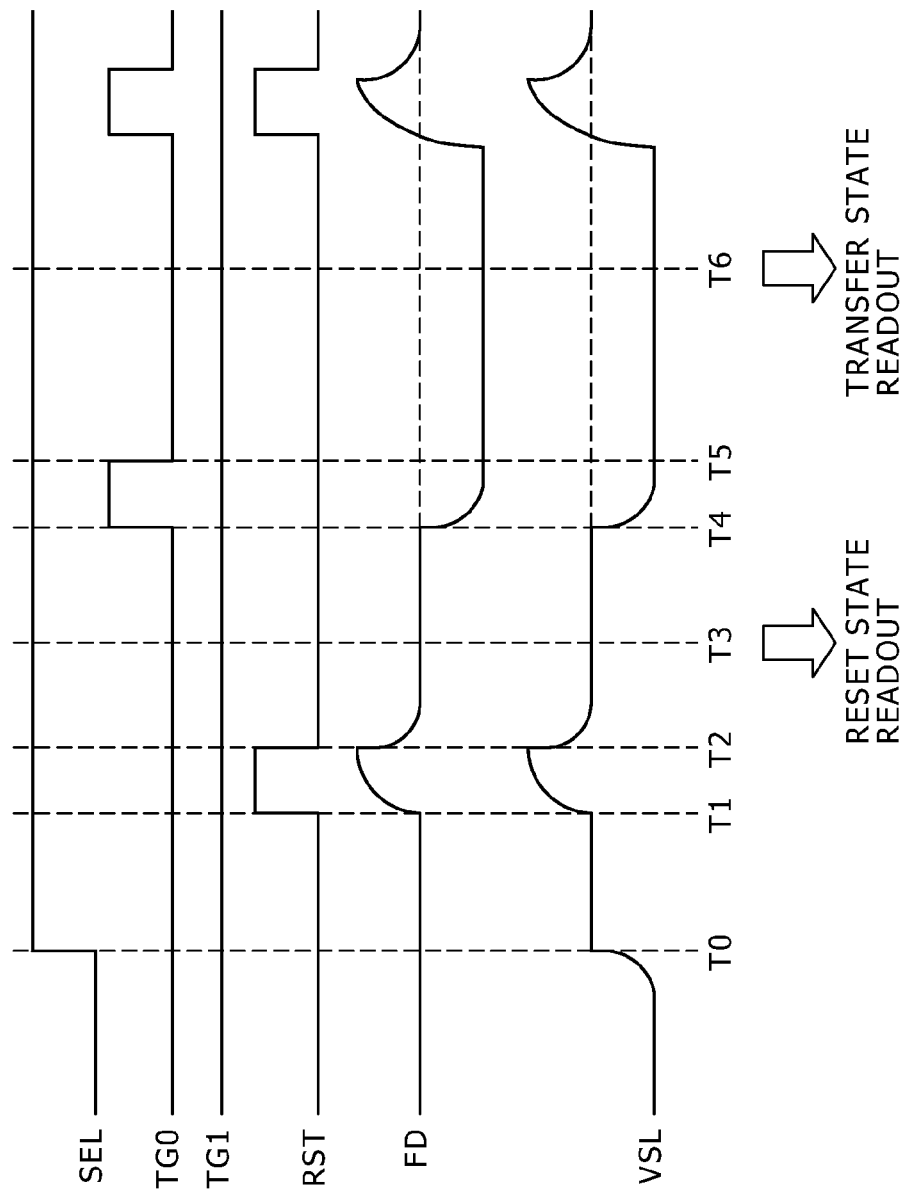
FIG. 3 is a timing diagram of assistance in explaining normal operation of a shared pixel unit.

The driving signal SEL, the driving signals TG0 and TG1, and the driving signal RST are shown in order in the first to the fourth from the top of FIG. 3. The voltage levels of voltages at the floating diffusion (FD) 53 and the vertical signal line (VSL) 57 are shown in the fifth and the sixth, respectively, from the top of FIG. 3.

First, when the driving signal SEL is set to an H-level at time T0, output to the VSL 57 is switched on, so that the voltage level of the VSL 57 is increased.

The driving signal RST at an H-level in the form of a pulse in a period of time T1 to T2 resets the charge accumulated in the FD 53.

At time T3, the A/D converter 23 for example reads out the voltage of the VSL 57 from this state. Thus, the readout of the reset state of the photodiode 51-1 is completed.

Next, when the driving signal TG0 is set to an H-level at time T4, the charge accumulated in the photodiode 51-1 is transferred to the FD 53. At this time, the voltage level of the FD 53 is determined according to the amount of the transferred charge (time T5). In addition, the voltage level of the VSL 57 is simultaneously determined via the amplifying transistor 55 and the selecting transistor 56.

At time T6, the A/D converter 23 for example reads out the voltage of the VSL 57 from this state. Thus, the readout of the transfer state of the photodiode 51-1 is completed.

Then, so-called CDS (Correlated Double Sampling) processing that removes noise by obtaining a difference between the reset state and the transfer state read out as described above is performed. Thus, a pixel signal from which noise is removed can be read out.

[Defect Detecting Process in Shared Pixel Unit]

A defect detecting process in the shared pixel unit 41 in FIG. 2 will next be described with reference to a flowchart of FIG. 4 and a timing diagram of FIG. 5.

The defect detecting process in the shared pixel unit 41 is performed at a time of turning on power to the image pickup device 11, at a time of changing an operation mode to a pixel addition mode, a pixel discrete reduction mode or the like, and before output of a pixel signal, for example. The defect detecting process performed at a time of turning on power to the image pickup device 11 will be described in the following.

In step S11, the controlling section 25 in the image pickup device 11 (FIG. 1) determines on the basis of a signal from the operating section 24 whether a power button as the operating section 24 is operated by a user to give an instruction to turn on power to the image pickup device 11.

When it is determined in step S11 that the instruction to turn on the power is not given, the process of step S11 is repeated until the instruction to turn on the power is given.

When it is determined in step S11 that the instruction to turn on the power is given, the controlling section 25 starts a power supply circuit not shown in the figure. The process proceeds to step S12.

In step S12, the controlling section 25 cancels the standby state of each part of the image pickup device 11. Each part of the image pickup device 11 is started by cancelling the standby state of each part of the image pickup device 11 and supplying power from the power supply circuit to each part of the image pickup device 11.

In step S13, the image sensor 22 is started by control of the controlling section 25 with the standby state of the image sensor 22 cancelled and with power supplied from the power supply circuit to the image sensor 22. More specifically, the controlling section 25 operates the shared pixel unit 41 within the image sensor 22 by controlling the timing controlling section 26 as shown in the timing diagram of FIG. 5.

Figure 5:
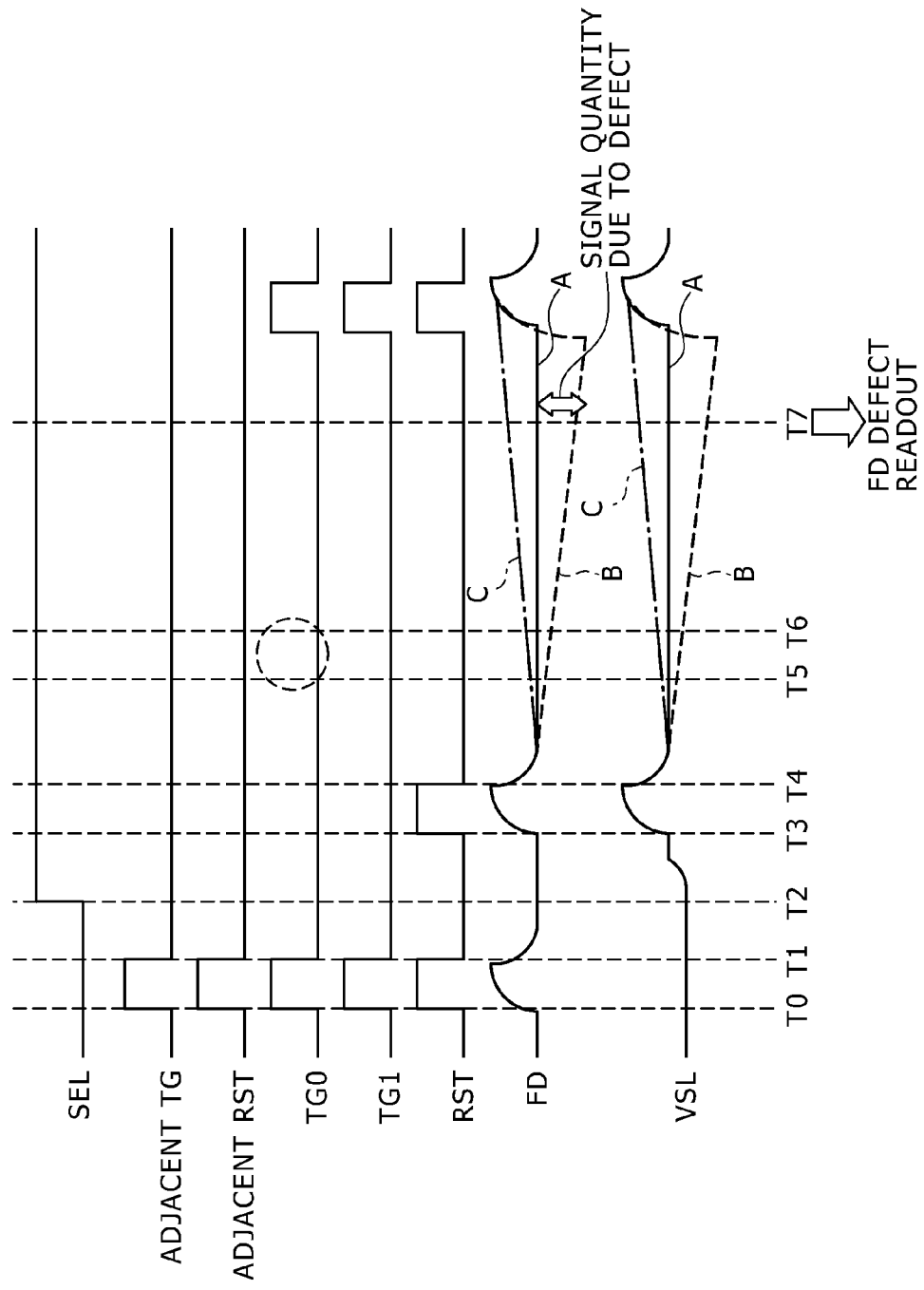
FIG. 5 is a timing diagram of assistance in explaining operation of a shared pixel unit in the defect detecting process of FIG. 4.

As with the timing diagram of FIG. 3, the timing diagram of FIG. 5 shows the driving signal SEL, the driving signals TG0 and TG1, and the driving signal RST in order from the first, fourth, fifth, and sixth from the top of FIG. 5, and respectively shows the voltage levels of voltages at the FD 53 and the VSL 57 in the seventh and eighth from the top of FIG. 5.

A driving signal TG (corresponding to the driving signals TG0 and TG1 in the shared pixel unit 41) and a driving signal RST of a shared pixel unit adjacent to the shared pixel unit 41 are shown in the second and third, respectively, from the top of FIG. 5. Incidentally, the driving signal TG and the driving signal RST of the shared pixel unit adjacent to the shared pixel unit 41 will hereinafter be referred to simply as the adjacent driving signal TG and the adjacent driving signal RST, respectively.

After starting the image sensor 22, the controlling section 25 sets the adjacent driving signal TG and the adjacent driving signal RST, the driving signals TG0 and TG1, and the driving signal RST to an H-level in the form of a pulse by controlling the timing controlling section 26 in a period from time T0 to time T1.

Thus, charges accumulated in the photodiodes 51-1 and 51-2 and the FD 53 are reset, and charges accumulated in photodiodes in the adjacent shared pixel unit are reset. In general, a photodiode is highly likely to be saturated with charge immediately after power is turned on. It is thus possible to suppress the leaking in of a charge from an adjacent shared pixel unit, that is, so-called blooming when photodiodes of the adjacent shared pixel unit are saturated with charge.

Next, at time T2, the controlling section 25 sets the selecting signal SEL to an H-level by controlling the timing controlling section 26.

When the controlling section 25 sets the driving signal RST to an H-level in the form of a pulse by controlling the timing controlling section 26 in a period from time T3 to time T4, the charge accumulated in the FD 53 is reset again.

In the normal operation at the time of readout of a pixel signal which normal operation has been described with reference to the flowchart of FIG. 3, the driving signal TG0 is set to an H-level from this state in a period from time T5 to time T6. However, in the defect detecting process, the timing controlling section 26 does not set the driving signal TG0 to an H-level in the period from time T5 to time T6, as indicated by a circle mark of a broken line in FIG. 5. That is, the reset state continues in the shared pixel unit 41 (photodiode 51-1).

Figure 4:
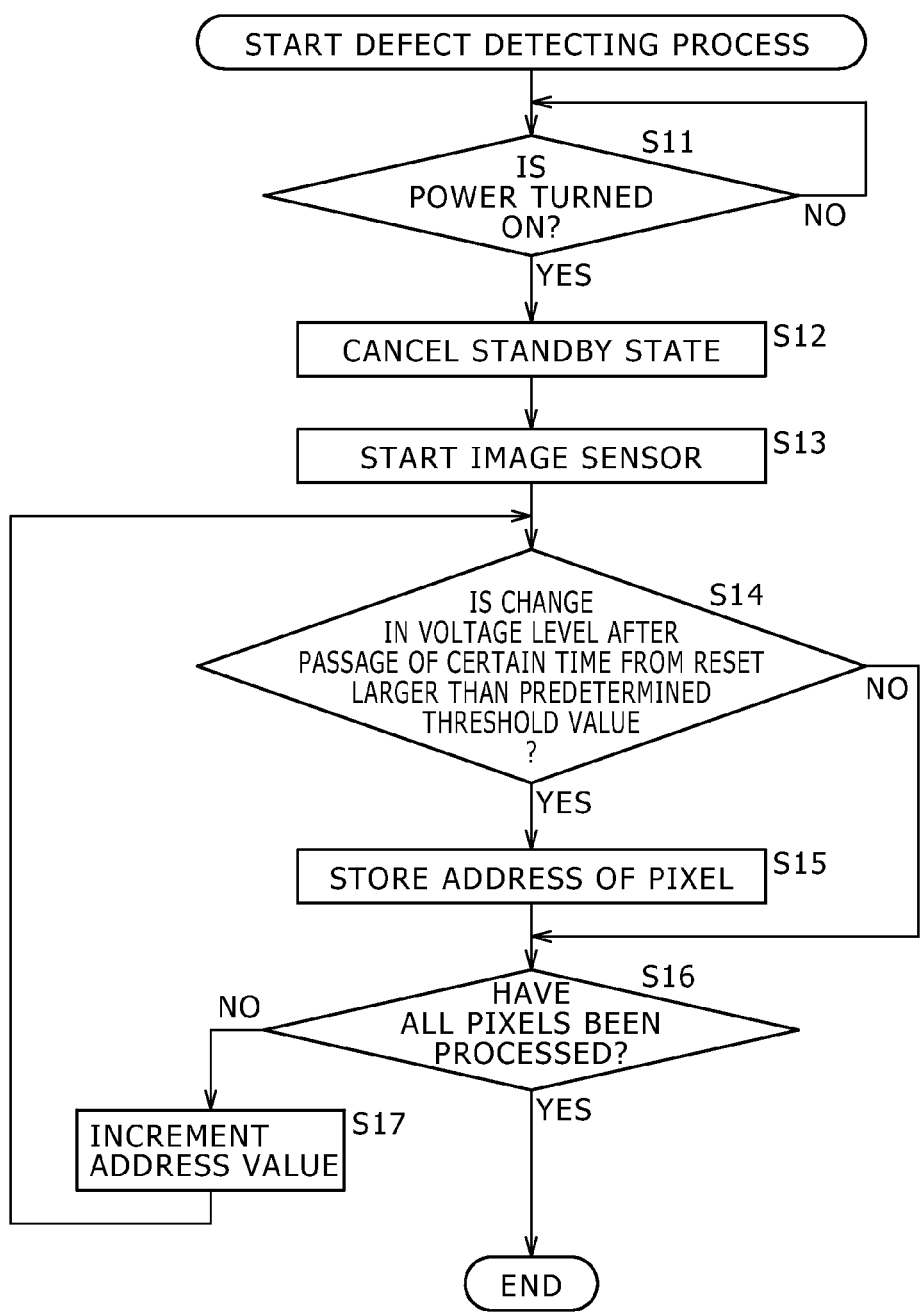
FIG. 4 is a flowchart of assistance in explaining an example of a defect detecting process.

Returning to the flowchart of FIG. 4, the detecting section 27 in step S14 determines whether a change in voltage level of the VSL 57 after passage of a certain time from the resetting of the FD 53 is larger than a predetermined threshold value.

When it is determined in step S14 that the change in voltage level of the VSL 57 after the passage of the certain time from the resetting of the FD 53 is not larger than the predetermined threshold value, that is, when the voltage level of the FD 53 does not change at time T7 in the timing diagram of FIG. 5 after time T6, and in turn the voltage level of the VSL 57 does not change at time T7 after time T6, as indicated by a solid line A, it is determined that the FD 53 does not have a defect. The process skips step S15, and proceeds to step S16.

On the other hand, when it is determined in step S14 that the change in voltage level of the VSL 57 after the passage of the certain time from the resetting of the FD 53 is larger than the predetermined threshold value, that is, when the voltage level of the FD 53 changes at time T7 in the timing diagram of FIG. 5 after time T6, and in turn the change in voltage level of the VSL 57 at time T7 after time T6 is larger than the predetermined threshold value, it is determined that the FD 53 has a defect. The process proceeds to step S15.

More specifically, when the voltage level of the FD 53 and the VSL 57 is lowered from time T6 to time T7 as indicated by a broken line B in the timing diagram of FIG. 5, it is determined that there is a white defect. When the voltage level of the FD 53 and the VSL 57 is raised from time T6 to time T7 as indicated by alternate long and short dashed lines C, it is determined that there is a black defect. When a pixel has a white defect, the output level of the pixel is higher than an original output level, and the pixel appears to be white in an image. When a pixel has a black defect, on the other hand, the output level of the pixel is lower than an original output level, and the pixel appears to be black in an image.

When the change in voltage level of the VSL 57 during the period from time T6 to time T7 is thus larger than the predetermined threshold value, the detecting section 27 in step S15 supplies the address storing section 28 with an address indicating the position of the pixel (photodiode 51-1) set as an object of defect detection as the address of a defective pixel, and makes the address storing section 28 store the address.

In step S16, the controlling section 25 determines whether the process of steps S14 and S15 has been performed for all pixels in the image sensor 22.

When it is determined in step S16 that the process of steps S14 and S15 has not been performed for all the pixels, the process proceeds to step S17, where the controlling section 25 increments an address value for counting an address which address value is retained in a memory not shown in the figures to the address value of an address corresponding to a pixel to be next set as an object of processing. Then the process of steps S14 to S17 is repeated.

When it is determined in step S16 that the process of steps S14 and S15 has been performed for all the pixels, on the other hand, the process is ended.

When a so-called through image for allowing a user to check an image of a subject which image is being picked up is to be displayed on the display section 30, for example, after the defect detecting process as described above, pixel signals (pixel values) are read out as described with reference to the timing diagram of FIG. 3. At this time, the correcting unit 29a of the image processing section 29 reads the address of a defective pixel which address is stored in the address storing section 28. When the pixel value of a pixel corresponding to the address (correction object pixel) is read out, the correcting unit 29a corrects the pixel value of the correction object pixel by for example obtaining a predicted value of the pixel value of the correction object pixel from pixels on the periphery of the correction object pixel and replacing the pixel value with the predicted value.

Incidentally, a method for correcting the pixel value of the correction object pixel is not limited to the above-described method, but may be another method.

According to the above process, an image pickup device without a light shielding device for blocking light such as an iris or the like does not need to set a solid-state image pickup element in a light shielding state, and does not need to have a nonvolatile memory for storing the addresses of defective pixels. Thus, a defect at a floating diffusion in the solid-state image pickup element of the image pickup device as described above can be detected with more ease and at low cost.

Incidentally, while the process of steps S14 and S15 is performed for all the pixels in the image sensor 22 in the flowchart of FIG. 4, the process of steps S14 and S15 may be performed for one of pixels within a shared pixel unit because the FD 53 as an actual object of defect detection is shared by the pixels within the shared pixel unit. Thus, when two pixels share a shared pixel unit, half of an amount of processing when all the pixels are processed suffices, and when four pixels share a shared pixel unit, one-fourth of the amount of processing when all the pixels are processed suffices. In addition, when the addresses of pixels within a shared pixel unit are associated with each other, the address of one of the pixels within the shared pixel unit suffices as the address of a defective pixel which address is stored in the address storing section 28.

In the above, description has been made of a defect detecting process in a case where the floating diffusion (FD) has a defect (which process will hereinafter be referred to as an FD defect detecting process). In the following, description will be made of a defect detecting process in a case where the photodiode (PD) has a defect such as grows in a short time (which process will hereinafter be referred to as a PD short-time defect detecting process).

2. Second Embodiment

The configuration of an image pickup device that performs the PD short-time defect detecting process is basically similar to that of the image pickup device 11 shown in FIG. 1, and therefore description thereof will be omitted.

[Defect Detecting Process in Shared Pixel Unit]

The PD short-time defect detecting process will be described in the following with reference to a flowchart of FIG. 6 and a timing diagram of FIG. 7.

Figure 6:
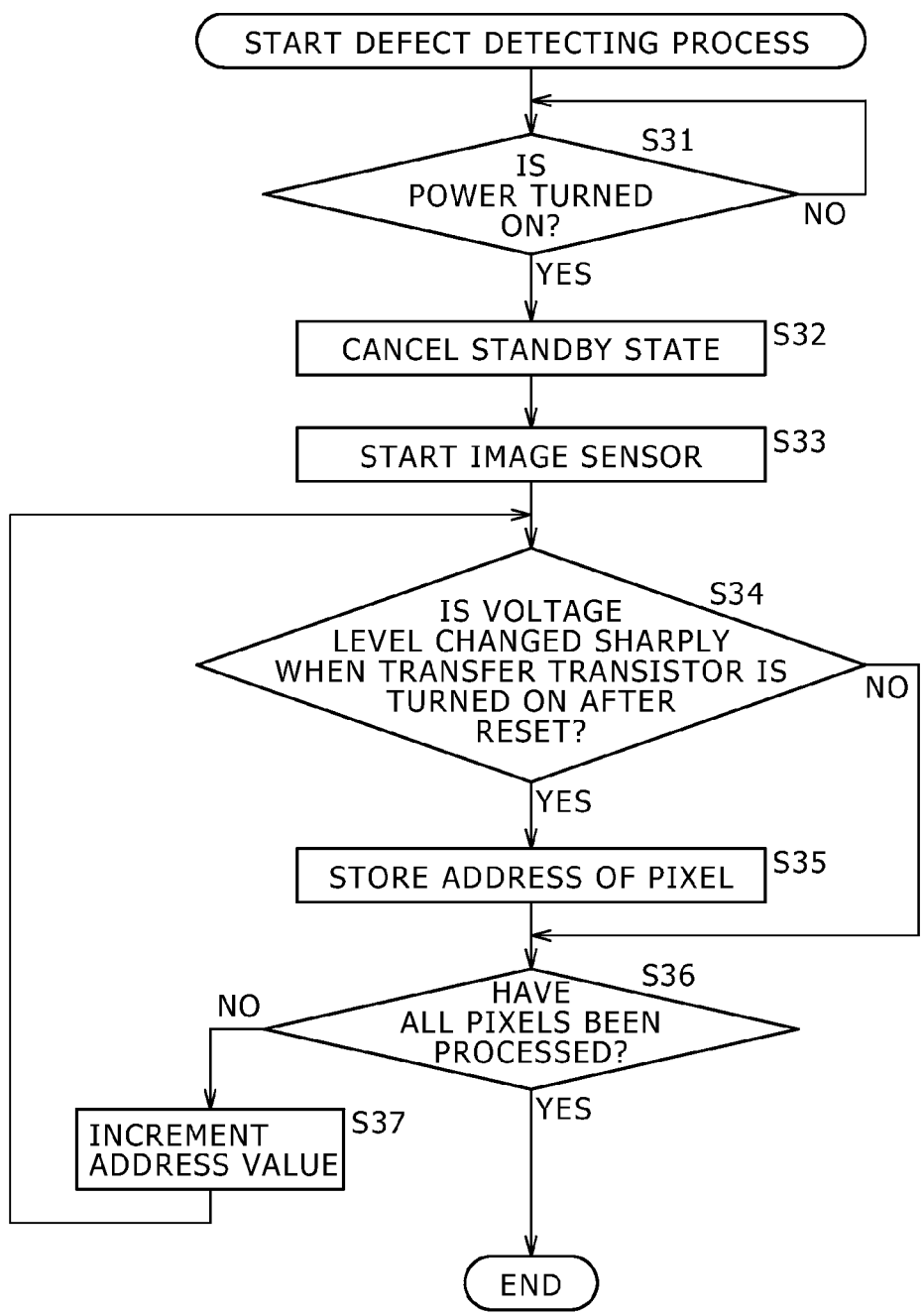
FIG. 6 is a flowchart of assistance in explaining an example of a defect detecting process.

Incidentally, a process of steps S31 to S33 and a process of S35 to S37 in the flowchart of FIG. 6 are similar to the process of steps S11 to S13 and the process of S15 to S17 in the flowchart of FIG. 4, and therefore description thereof will be omitted.

Figure 7:
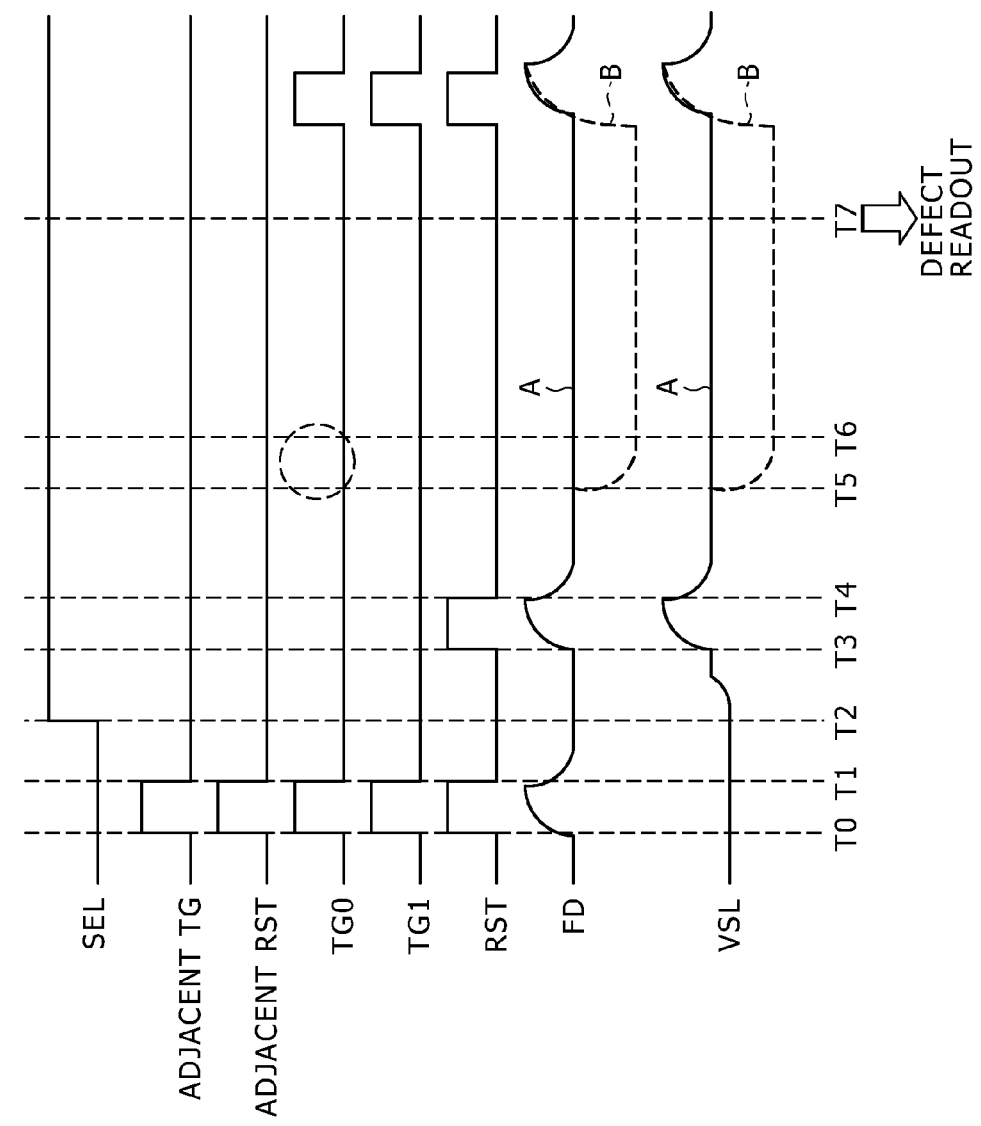
FIG. 7 is a timing diagram of assistance in explaining operation of a shared pixel unit in the defect detecting process of FIG. 6.

In addition, operations at times T0 to T4 in the timing diagram of FIG. 7 are similar to the operations at times T0 to T4 in the timing diagram of FIG. 5, and therefore description thereof will be omitted.

Specifically, in step S34, a detecting section 27 determines whether a voltage level at a VSL 57 is changed sharply when a transfer transistor 52-1 is turned on after an FD 53 is reset.

In the operation of the FD defect detecting process described with reference to the timing diagram of FIG. 5, the driving signal TG0 is not set to an H-level in the period from time T5 to time T6 from the state of the charge accumulated in the FD 53 being reset after time T4. However, in the operation of the PD short-time defect detecting process shown in the timing diagram of FIG. 7, a timing controlling section 26 sets the driving signal TG0 to an H-level in the period from time T5 to time T6.

At this time, the charge accumulated in a photodiode 51-1 is transferred to the FD 53. The charge accumulated in the photodiode 51-1 is only an amount of charge accumulated in a period (exposure time) from time T1 at which the charge is reset to time T6. Because the period from time T1 to time T6 is a very short time, the charge accumulated during this period is a very small amount of charge, though depending on an amount of light received by the photodiode 51-1, and thus a pixel signal almost close to that of a black pixel is output.

Thus, when the photodiode 51-1 does not have a defect, the voltage level of the FD 53 at time T7 does not change from time T6, and in turn the voltage level of the VSL 57 at time T7 does not change from time T6, as indicated by a solid line A in the timing diagram of FIG. 7. That is, when it is determined in step S34 that the voltage level of the VSL 57 is not changed when the transfer transistor 52-1 is turned on in a short exposure time from the resetting of the FD 53, the process skips step S35, and proceeds to step S36.

When the photodiode 51-1 has a defect, on the other hand, the voltage level of the FD 53 and the voltage level of the VSL 57 decrease sharply at time T5, as indicated by a broken line B in the timing diagram of FIG. 7. This occurs when a defect growing in a short time occurs in the photodiode 51-1 and an amount of charge exceeding an amount of charge normally transferred to the FD 53 is transferred to the FD 53. That is, when it is determined in step S34 (time T7 in the timing diagram of FIG. 7) that the voltage level of the VSL 57 is changed sharply when the transfer transistor 52-1 is turned on in a short exposure time from the resetting of the FD 53, the process proceeds to step S35. Incidentally, a defect occurring in the example of FIG. 7 is a white defect, which causes a white dot to appear to be expanding rapidly in an image in particular.

Incidentally, an example in which a defect grows in a short time in the photodiode 51-1 has been described with reference to the timing diagram of FIG. 7. Also in a case where a defect (white defect) grows in a short time in the FD 53, the voltage level of the FD 53 and the voltage level of the VSL 57 decrease sharply.

Also after the PD short-time defect detecting process as described above, as after the FD defect detecting process, pixel signals (pixel values) are read out as described with reference to the timing diagram of FIG. 3. At this time, the correcting unit 29a of an image processing section 29 reads the address of a defective pixel which address is stored in an address storing section 28. When the pixel value of a pixel corresponding to the address (correction object pixel) is read out, the correcting unit 29a corrects the pixel value of the correction object pixel by for example obtaining a predicted value of the pixel value of the correction object pixel from pixels on the periphery of the correction object pixel and replacing the pixel value with the predicted value.

According to the above process, an image pickup device without a light shielding device for blocking light such as an iris or the like does not need to set a solid-state image pickup element in a light shielding state, and does not need to have a nonvolatile memory for storing the addresses of defective pixels. Thus, a defect growing in a short time at a photodiode or a floating diffusion in the solid-state image pickup element of the image pickup device as described above can be detected with more ease and at low cost.

Incidentally, in the above, the image pickup device 11 (FIG. 1) stores the address of a defective pixel detected by the detecting section 27 in the address storing section 28. However, the detecting section 27 may directly supply the address of the detected defective pixel to the image processing section 29. That is, a chip for performing the processing of the detecting section 27 and a chip for performing the processing of the image processing section 29 may be provided separately from each other, or one chip for performing the processing of the detecting section 27 and the processing of the image processing section 29 may be provided. In addition, when processing subsequent to the processing of the image processing section 29 is performed by another chip, the chip may make threshold value determination for so-called RAW data output from the image sensor 22 to thereby detect and correct defective pixels.

In addition, in the above, the amplifying transistor, the reset transistor, the floating diffusion and the like in the image sensor 22 are shared by two pixels. However, the number of sharing pixels is not limited to two, and the amplifying transistor, the reset transistor, the floating diffusion and the like do not need to be shared.

The series of processes described above can be carried out not only by hardware but also by software. When the series of processes is to be carried out by software, a program constituting the software is installed from a program recording medium onto a computer incorporated in dedicated hardware, or a general-purpose personal computer, for example, that can perform various functions by installing various programs thereon.

It is to be noted that the program executed by the computer may be a program in which processing is performed in time series in the order described in the present specification, or may be a program in which processing is performed in parallel or in necessary timing when a call is made, for example.

In addition, embodiments of the present invention are not limited to the foregoing embodiments, and various changes can be made without departing from the spirit of the present invention.

The present application contains subject matter related to that disclosed in Japanese Priority Patent Application JP 2009-283760 filed in the Japan Patent Office on Dec. 15, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An image pickup device without a light shielding device that blocks light received by a solid-state image pickup element, the image pickup device comprising:
   circuitry configured to:
      supply a signal that resets a charge of a floating diffusion disposed so as to correspond to one or a plurality of pixels and a signal that resets a charge accumulated in a photodiode of a pixel in said solid-state image pickup element; and
      detect said pixel in which a change in output of said pixel is larger than a predetermined threshold value in an event the charge accumulated in said photodiode is reset in a predetermined exposure time from the reset of the charge of said floating diffusion.

2. The image pickup device of claim 1, wherein said circuitry is further configured to store an address that indicates a position of said detected pixel.

3. The image pickup device of claim 1, wherein said circuitry is further configured to correct a pixel value read from said pixel based on a pixel value of a peripheral pixel on a periphery of said pixel.

* * * * *